Aug. 20, 1968  E. D. A. GEOGHEGAN  3,398,340

HIGH-VOLTAGE ELECTRICAL CAPACITOR

Filed Oct. 19, 1966

United States Patent Office 3,398,340
Patented Aug. 20, 1968

3,398,340
HIGH-VOLTAGE ELECTRICAL CAPACITOR
Eamonn D. A. Geoghegan, Fort Pierce, Fla., assignor to Sprague Electric Company, North Adams, Mass., a corporation of Massachusetts
Filed Oct. 19, 1966, Ser. No. 587,777
5 Claims. (Cl. 317—260)

ABSTRACT OF THE DISCLOSURE

Terminal studs have flanges which are connected to the foil extensions of an extended-foil capacitance section that is convolutely wound on a solid core. The terminal studs are secured to the solid core and to cover assemblies which are compressed in an insulating housing so as to seal the capacitance section therein.

---

The present invention relates to high-voltage electrical capacitors, and more particularly to a terminal and cover assembly providing a hermetic closure for a corona-free high-voltage capacitor.

Two problems that continually face designers of corona-free high-voltage capacitors are (1) the problem of adequately securing a capacitance section in a fixed position within a protective case, so that the unit may withstand the shock and stress requirements of the component consumer and in particular the military, and (2) the problem of sealing the protective case so that no impregnant leaks from the case and no contaminant enters the case.

An object of this invention is the provision of a high-voltage capacitor capable of operating in ordinary atmosphere without flashover, and in reduced atmosphere with proper voltage derating.

Another object of this invention is the provision of a high-voltage capacitor having a terminal and cover assembly that provides a shock resistant and hermetic mounting of a capacitance section for corona-free operation.

Another object of this invention is the provision of a terminal and cover assembly for securing a capacitance section in an insulating housing to withstand vibration and leakage.

Figure 1:
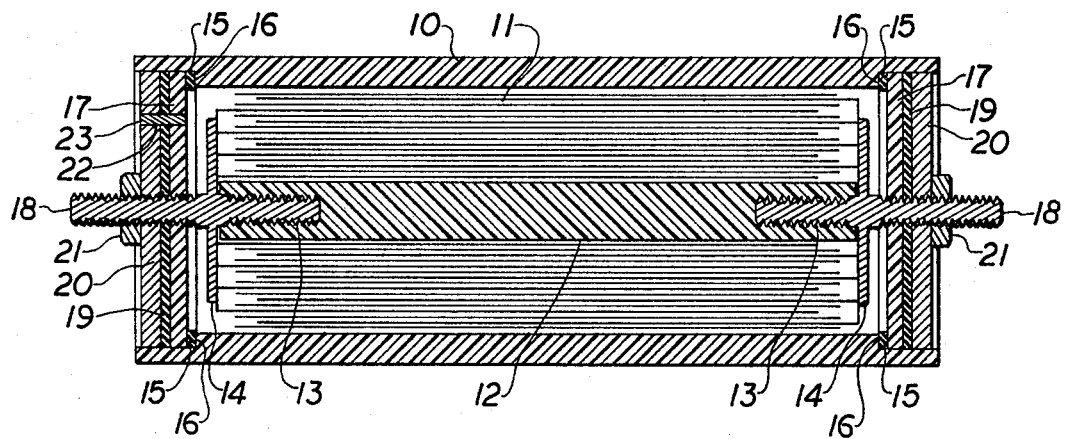
Figure 2:
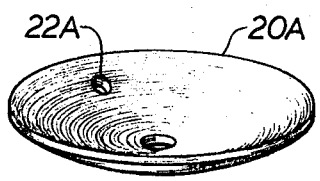

Other objects and advantages of the present invention will be made obvious to those skilled in the art by the following description when considered in relation to the accompanying drawing, in which:

FIGURE 1 is a cross-section of a high-voltage capacitor constructed according to this invention; and
FIGURE 2 is an alternate embodiment of one portion of the cover assembly of this invention.

In accordance with this invention a corona-free high-voltage capacitor is obtained by mounting a solid core capacitance section on terminal studs secured in compressed covers that seal an insulating housing.

In general, the high-voltage capacitor of this invention is attained by a capacitance section of dielectric and electrode foils convolutely wound in extended-foil fashion on a solid core and sealed within an insulating housing. A terminal stud is secured to each end of the solid core and connected to the foil extensions. The outer ends of the terminal studs are secured to cover assemblies which are compressed against the walls of the housing to seal the capacitor.

More particularly, this invention provides a solid insulator core upon which an extended-foil capacitance section is wound. The core has a metal stud mechanically secured in each of its ends. The metal studs have broad flange areas which extend at the edges of the capacitance section so as to electrically contact the extended foil electrodes at each end of the capacitance section. Each of the studs has a further threaded extension which, when the capacitance section is centered within the cylindrical insulator housing, extends beyond the end of the insulating housing and protrudes through a cover assembly at that end of the housing. Each of these cover assemblies comprises a gasket which fits a recessed step in the cylindrical housing, a thick phenolic washer, a flat neoprene gasket, and a thick metal closure member which may be a planar washer or a convex cup-shaped metal plate. The cover assemblies at the opposing ends of the housing are drawn together against the walls of the housing by nuts threaded on the stud extensions and tightened to a predetermined required torque.

FIGURE 1 shows a cross-section of a convolutely-wound capacitor having terminal and cover assemblies according to the present invention. The cylindrical insulating housing 10 of the capacitor is preferably of a phenolic resin; however, any other non-conducting plastic or ceramic material may be used for the purpose.

The capacitance section 11 consists of an extended-foil section of dielectric and electrode foils that are convolutely wound upon a solid insulator mandrel 12. Mechanically secured into each end of the solid mandrel are identical conductive metal studs 13, which have flange portions 14 which serve to mechanically and electrically connect the extended foils of the capacitance section. Each of the contacts provides a low resistance electrical connection.

Once the wound section 11 is inserted into the housing 10, the initial seal is provided by a cover assembly consisting of: (1) An O-ring or other gasket 15 which fits a recessed step 16 in each end of housing 10; (2) a thick phenolic washer 17 having an inner diameter which fits over an extended portion 18 of stud 13 and having an outer diameter which fits the recessed inner diameter 16 of housing 10; (3) a thin flat neoprene gasket washer 19, again with an inner diameter which fits over stud portion 18 and an outer diameter which fits the recessed inner diameter 16 of housing 10; and (4) a thick metal washer 20 inserted in like manner over stud portion 18 within recessed diameter 16.

The extended stud portion 18 is provided with a thread which permits a nut 21 to be threaded thereon. When a nut 21 is threaded on stud portion 18 at each end of the assembly and tightened, both cover assemblies are drawn tightly against the walls of housing 10 including each of the recessed steps 16 to compress the associated washer and gasket assemblies.

The seal is secured by soldering nut 21 to the threaded stud 18 and the metal washer 20 against which the nut lies in this tightened configuration.

At one end of the capacitor case 10 the sealing washers and gaskets are provided with a small circular aperture 22 which, once the seal has been secured by tightening the nuts 21, provides access to the capacitance section for drying, evacuation, impregnation and fill. This aperture 22 is threaded so that once the above operations are completed a threaded metal insert 23 is secured into the threaded aperture in the washer assembly, particularly the metal washer, and the metal insert 23 is soldered to the metal washer 20 to complete the hermetic seal.

Thus, according to this construction, capacitance section 11 is secured in position within capacitor case 10 by means of the studs 13 which are tied securely to the core 12 of the capacitance section and maintained in their centered configuration because of their passage through the rigid washer members of the end seal. The assembly of gaskets, washers and molded insulator which form the cover assembly and secure the section within the can provides an excellent hermetic seal.

One preferred method of mechanically securing the metal studs in the ends of the solid insulator mandrel is to provide the metal stud with a thread which tightly screws into an aperture in the end of the solid mandrel.

In this manner, the flange portion of the stud serves as a mechanical stop to fix the extension length of the stud when threaded into the aperture.

The threaded stud extension further provides a handy mounting means for the capacitor of this invention; the threading on the rigid metal stud making the construction particularly adaptable for this purpose.

Should it be desired to provide further protection for the capacitance section suspended within the case, the actual extended-foil section may be wrapped with layers of insulating material, such as kraft or corrugated paper, which are fastened with adhesive tape so that the completed capacitance section will fit snugly within the cylindrical outer housing.

The preferred capacitance section for the capacitor of this invention is a gap-wound extended-foil section in order to provide very low inductance. Even though the capacitors of this invention are rated for continuous D.C. operation, they are often used for high energy pulse operations. Gap-winding provides a network of capacitance sections that are physically in parallel, but electrically capacitive-coupled in series. Such a construction eliminates the necessity of using a plurality of physically separate sections that have to be mechanically connected in series in order to reach the desired voltage rating. Physical connection of separate sections introduces additional inductance which is undesirable for high energy pulsing applications.

The cylindrical housing and the solid core of the capacitance section may consist of any suitable insulator material, however, phenolic resins are preferred in both cases. The metallic stud, washer and insert members may consist of any suitable conductive metals such as brass or steel. Suitable impregnants for the capacitor of this invention include any of the conventional liquid dielectrics employed for high voltage operation, such as mineral oil, silicone oil, chlorinated diphenyl, and polybutene.

The sealing of the capacitor may be improved by substituting a heavy cup-shaped metal part such as that shown in FIGURE 2 which provides improved sealing force at its perimeter when the nuts are properly threaded upon the stud members. The cup-shaped member 20A inserts into the end seal assembly so that the convex portion faces outward and the peripheral edge is forced outward when the nut is tightened. The aperture 22A is threaded to receive the threaded insert 23.

Since it is obvious that many changes and modifications can be made in the above-described details without departing from the nature and spirit of the invention, it is to be understood that the invention is not limited to said details except as set forth in the appended claims.

What is claimed is:

1. A high-voltage capacitor having a capacitance section of dielectric and electrode foils convolutely wound in extended-foil fashion on a solid core and positioned within an insulating housing, wherein the improvement comprises a conductive terminal stud having a substantially centrally disposed broad conductive flange thereon secured to each end of said solid core with the flanges mechanically and electrically connected to the foil extensions extending from respective ends of said section, the outer end of each terminal stud being secured to a cover assembly compressed in sealing relationship against said housing.

2. The high-voltage capacitor of claim 1 wherein each said cover assembly comprises a relatively rigid insulating washer and a compressible gasket which fill the end of said housing, and a substantially coextensive conductive closure member joined to said terminal stud and compressing said washer and said gasket against said housing.

3. The high-voltage capacitor of claim 2 wherein each said terminal stud has inner and outer threaded portions, said conductive closure member is joined to said terminal stud by said outer threaded portion, and said stud is joined to said core by said inner threaded portion with said flange providing a broad area low resistance contact with said foil extensions.

4. The high-voltage capacitor of claim 3 wherein said housing has a recessed step in the inner wall at each end thereof, and each said cover assembly is compressed against the wall of said steps.

5. The high-voltage capacitor of claim 4 wherein said conductive closure member is convexed outwardly with its perimeter providing sealing force against the combination of said rigid washer and said compressible gasket.

References Cited

UNITED STATES PATENTS

| | | | |
|---|---|---|---|
| 1,990,819 | 2/1935 | Danziger | 317—260 |
| 2,450,423 | 10/1948 | Fraser | 317—260 X |
| 2,397,551 | 4/1946 | Leno | 317—260 X |
| 2,627,538 | 2/1953 | Brennan | 174—52 |
| 2,892,135 | 6/1959 | Woods | 174—52 |
| 2,957,041 | 10/1960 | Ziegler | 174—50.56 X |
| 3,148,240 | 9/1964 | Harrison | 174—52 |

LEWIS H. MYERS, Primary Examiner.

G. GOLDBERG, Assistant Examiner.

UNITED STATES PATENT OFFICE
CERTIFICATE OF CORRECTION

Patent No. 3,398,340                                               August 20, 1968

Eamonn D. A. Geoghegan

It is certified that error appears in the above identified patent and that said Letters Patent are hereby corrected as shown below:

Column 4, list of References Cited, add the following reference:

3,163,917    1/1965    Bilsing et al. --------- 29-25.42

Signed and sealed this 13th day of January 1970.

(SEAL)
Attest:

Edward M. Fletcher, Jr.                      WILLIAM E. SCHUYLER, JR.
Attesting Officer                                      Commissioner of Patents